D. & J. R. Pollock,
Fan Blower.

Nº 13,100. Patented June 19, 1855.

UNITED STATES PATENT OFFICE.

DAVID POLLOCK AND J. R. POLLOCK, OF LANCASTER, PENNSYLVANIA.

FAN-BLOWER.

Specification forming part of Letters Patent No. 13,100, dated June 19, 1855.

*To all whom it may concern:*

Be it known that we, DAVID POLLOCK and J. R. POLLOCK, of Lancaster, in the county of Lancaster and State of Pennsylvania, have invented certain new and useful Improvements in Fan-Blowers; and we do hereby declare that the following is a full, clear, and exact description of the same, reference being had to the accompanying drawings, forming part of this specification, in which—

Figure 2:
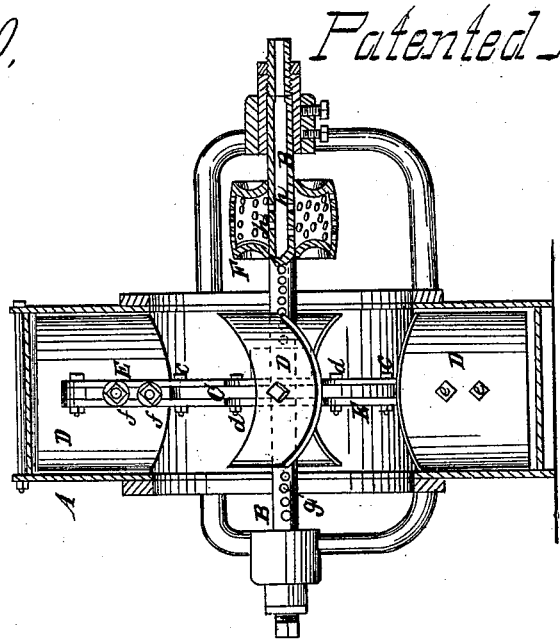
Figure 1:
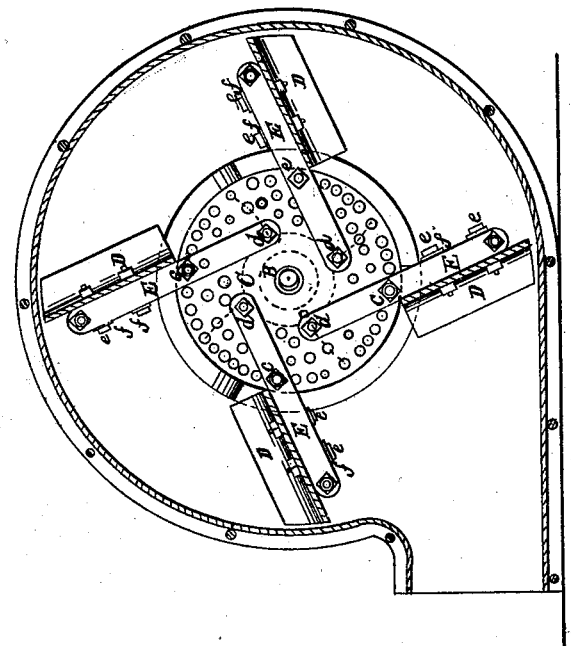

Figure 1 is a section perpendicular to the axis of a blower constructed according to our invention. Fig. 2 is a central section of the same parallel with the axis.

Similar letters of reference indicate corresponding parts in both figures.

This invention consists in certain provisions for increasing the supply of air to the fan for keeping the shaft and journals cool and for increasing the adhesion of the driving-belt to the drum or pulley.

A is the casing of the blower, which is constructed of the usual form.

B is the shaft, which is made hollow with open ends.

C is a disk or circle plate keyed firmly to the shaft for the purpose of attaching the wings D D. This circle-plate has a number of holes $a\,a$, arranged in a concentric circle near its circumference, and $b\,b$ holes arranged, as indicated in red lines in Fig. 1, in arcs described from the holes $a\,a$. These holes are for the purpose of receiving bolts $c\,c$ and $d\,d$ for securing the arms E E of the wings, the bolts $c\,c$ in the holes $a\,a$ serving as centers upon which the arms are adjustable as tangents to different circles to give different axles to the wings by changing the position of the inner ends of the arms to different holes $b\,b$, where they are secured by the bolts $d\,d$. This variation of the angles of the blowers is desirable to suit the different densities of the air in which the blower may be placed and to suit the velocity of the fan, so as to get a blast of the strength required. The arms E E are made double, as shown in Fig. 2, and thus are enabled to embrace the circle-plate C within them, and also allow facility for adjusting the wings at the proper distance from the shaft, the wings being secured to the arms by bolts $e\,e$ passing through them, and clamping-plates $f\,f$ and nuts at the back.

The hollow shaft B has apertures $g\,g$ in its sides within the blower-casing, and by the action of the fan air is drawn in at the open ends of the shaft and through these apertures into the casing. By this means an additional supply of air is obtained and the shaft and its journals are kept cool.

The pulley F, which receives the driving-belt, is made, like a drum, hollow, and with closed ends. Its face is perforated all over, and apertures $h\,h$ are made in the shaft within it to allow more air to be drawn into the blower-casing through the drum and the shaft and at the same time by displacing the air between the belt and the face of the pulley to increase the adhesion of the belt.

What we claim as our invention, and desire to secure by Letters Patent, is—

1. Though we do not of itself claim the employment of a hollow shaft, we claim making the shaft hollow with open ends and with apertures $g\,g$ in the sides within the blower-casing, as set forth, for the purpose of inducing a current of air through the shaft to keep it cool and at the same time to increase the supply to the fan.

2. Making the pulley F, which receives the driving-belt, hollow with closed ends and a perforated face, and providing openings from its interior into the shaft, as herein set forth, for the purpose of causing the displacement of the air between the belt and the face of the pulley and at the same time increasing the supply to the fan.

DAVID POLLOCK.
J. R. POLLOCK.

Witnesses;
  J. C. VAN CAMP,
  O. J. DICKEY.